US009177413B2

(12) United States Patent
Tatarinov et al.

(10) Patent No.: US 9,177,413 B2
(45) Date of Patent: Nov. 3, 2015

(54) UNIQUE PRIMITIVE IDENTIFIER GENERATION

(71) Applicant: NVIDIA Corporation, Santa Clara, CA (US)

(72) Inventors: Andrei S. Tatarinov, Moscow (RU); Yury Uralsky, Santa Clara, CA (US); Kirill A. Dmitriev, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 124 days.

(21) Appl. No.: 13/928,302

(22) Filed: Jun. 26, 2013

(65) Prior Publication Data

US 2015/0002508 A1 Jan. 1, 2015

(51) Int. Cl.
*G06T 15/50* (2011.01)
*G06T 15/60* (2006.01)
*G06T 15/00* (2011.01)

(52) U.S. Cl.
CPC .................................. *G06T 15/005* (2013.01)

(58) Field of Classification Search
CPC ................................................ G06T 15/005
USPC ..................................................... 345/423
See application file for complete search history.

(56) References Cited

U.S. PATENT DOCUMENTS

| | | | | |
|---|---|---|---|---|
| 5,594,854 | A * | 1/1997 | Baldwin et al. | 345/441 |
| 5,894,308 | A * | 4/1999 | Isaacs | 345/420 |
| 6,313,838 | B1 * | 11/2001 | Deering | 345/420 |
| 6,597,363 | B1 * | 7/2003 | Duluk et al. | 345/506 |
| 6,631,423 | B1 * | 10/2003 | Brown et al. | 719/323 |
| 6,952,206 | B1 * | 10/2005 | Craighead | 345/422 |
| 6,977,649 | B1 * | 12/2005 | Baldwin et al. | 345/419 |
| 7,620,904 | B1 * | 11/2009 | Davis et al. | 715/764 |
| 7,903,116 | B1 * | 3/2011 | Klock et al. | 345/501 |
| 8,284,205 | B2 * | 10/2012 | Miller et al. | 345/502 |
| 2002/0145611 | A1 * | 10/2002 | Dye et al. | 345/543 |
| 2005/0025385 | A1 * | 2/2005 | Chang et al. | 382/276 |
| 2005/0140694 | A1 * | 6/2005 | Subramanian et al. | 345/619 |
| 2005/0253855 | A1 * | 11/2005 | Hutchins et al. | 345/506 |
| 2008/0030513 | A1 * | 2/2008 | Jiao et al. | 345/530 |
| 2011/0018884 | A1 * | 1/2011 | Ritts et al. | 345/522 |

OTHER PUBLICATIONS

U.S. Appl. No. 13/802,182, filed Mar. 13, 2013.
U.S. Appl. No. 13/666,878, filed Nov. 1, 2012.
U.S. Appl. No. 13/725,721, filed Dec. 21, 2012.

* cited by examiner

*Primary Examiner* — Stephen R Koziol
*Assistant Examiner* — Robert Craddock
(74) *Attorney, Agent, or Firm* — Zilka-Kotab, PC

(57) ABSTRACT

A system, method, and computer program product are provided for generating unique primitive identifiers. A specified scope and geometry for a scene is received. A primitive identifier is generated for each primitive of a particular type, where each of the primitive identifiers is unique within the specified scope, and where the primitives are generated as the geometry for the 3D graphics scene is processed by a graphics processing unit. Different types may include patches, triangles, and vertices. The specified scope may be one of a frame, region, pixel, or draw call.

19 Claims, 11 Drawing Sheets

UNIQUE PRIMITIVE IDENTIFIER GENERATION

FIELD OF THE INVENTION

The present invention relates to graphics processing, and more particularly to generating identifiers for graphics primitives.

BACKGROUND

Some graphics processing techniques that improve performance benefit from an ability to uniquely identify primitives or enumerate primitives within a scene or within a three-dimensional (3D) object. For example, deferred shading renders a scene in a first processing pass to perform hidden surface removal (i.e., z-buffering) without shading the pixels. Then, the scene is rendered in a second processing pass to shade the visible pixels. To shade the pixels, the graphics processor determines which primitive is visible for each pixel by comparing data generated and stored during the first pass with data generated during the second pass (e.g., normal vector, texture map parameters, and z or depth).

When the data generated for the second pass is not guaranteed to be the same as the data generated for the first pass, determination of the visible primitives by comparing the data can be unreliable. When multiple samples are used to generate an anti-aliased image, comparing the data can also be unreliable because more than one primitive may be visible for a single pixel and it may not be possible to determine which primitives are the visible primitives. The data that is compared does not necessarily distinguish between two primitives. In other words, the data that is stored during the first pass does not provide a unique identifier for a primitive.

Thus, there is a need for addressing the issue of uniquely identifying primitives and/or other issues associated with the prior art.

SUMMARY

A system, method, and computer program product are provided for generating unique primitive identifiers. A specified scope and geometry for a scene is received. A primitive identifier is generated for each primitive of a particular type, where each of the primitive identifiers is unique within the specified scope, and where the primitives are generated as the geometry for the 3D graphics scene is processed by a graphics processing unit. Different types may include patches, triangles, and vertices. The specified scope may be one of a frame, region, pixel, or draw call.

DETAILED DESCRIPTION

A unique primitive identifier may be used to be able to unequivocally determine, within the specified scope and for geometric primitives of a particular type, the geometric primitive from which data that is stored to an output surface originated. In the context of the following description, a unique primitive identifier is an identifier that is associated with any geometric primitive of a particular type that is unique within a specified scope among all geometric primitives of the particular type that are also within the specified scope and that are being processed or have been already processed. In the context of the following description, a type of geometric primitive may include, but not limited to, a patch, mesh, triangle, vertex, and a fragment. In the context of the following description, a specified scope of the unique primitive identifiers is defined as any set of rules that bounds the generation of the unique primitive identifiers. For example, the specified scope may be related to a display surface that geometry for a scene is being rendered to; e.g., the scope may be specified as an entire display surface, a region of the display surface, or a single pixel within the display surface. The specified scope may be the region in graphics processor unit (GPU) video memory, GPU cache or random access memory (RAM). The specified scope may be a geometric object or a drawcall, a set of drawcalls, or an instance within an instanced drawcall. Furthermore, a scope can be specified as a combination of other scopes.

Figure 1:
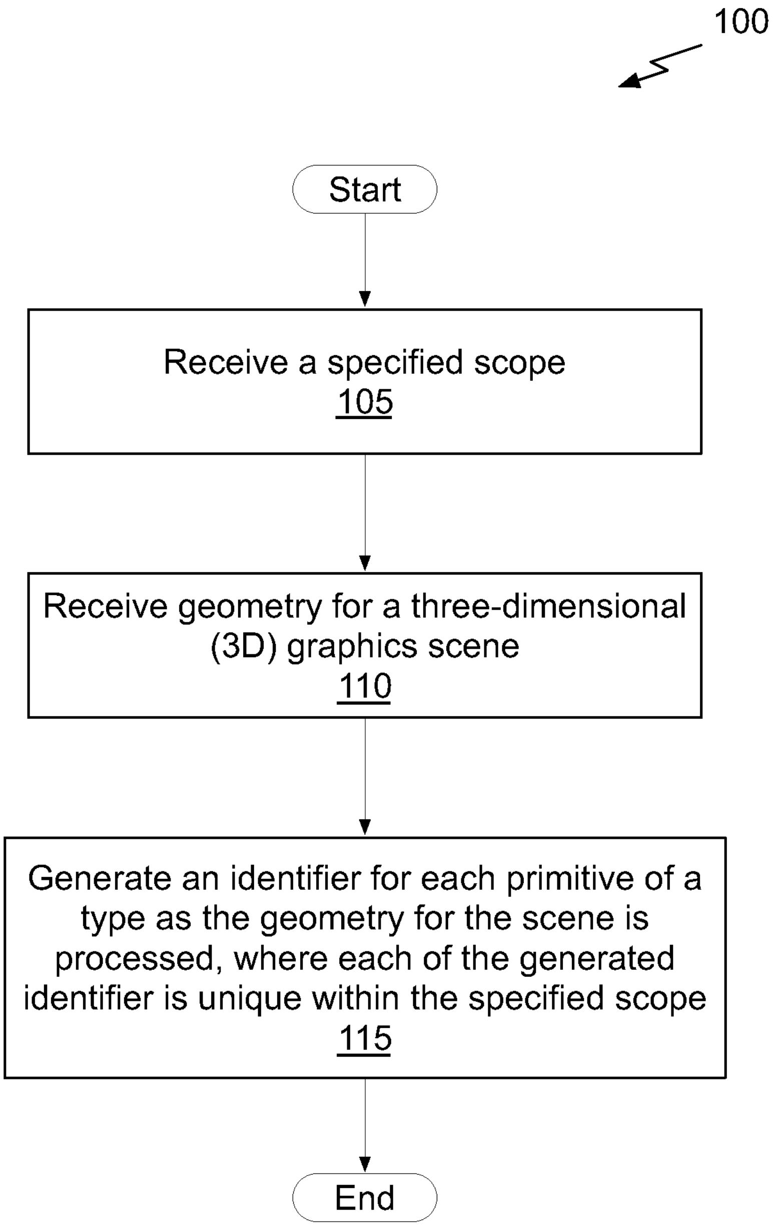
FIG. 1 illustrates a flowchart of a method for generating unique identifiers, in accordance with one embodiment.

FIG. 1 illustrates a flowchart of a method 100 for generating unique identifiers, in accordance with one embodiment. At step 105, a specified scope is received. At step 110, geometry for a three-dimensional (3D) graphics scene is received. At step 115, an identifier for each primitive of a type is generated as the geometry for the scene is processed, where each of the generated identifiers is unique within the specified scope.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

A unique primitive identifier may enable a processor to be able to unequivocally determine, within the specified scope and for geometric primitives of a particular type, the geometric primitive from which data that is stored to an output or display surface originated. In one embodiment, the scope may be specified as a region of a frame and a unique primitive identifier may be generated for each triangle primitive that intersects the region. The number of unique triangle primitives that intersect the region may be determined based on the unique primitive identifiers. When the region is a single pixel of a multi-sampled surface, the unique primitive identifiers may be stored to the multi-sampled output surface during a first processing pass. The unique primitive identifiers may be read during a second processing pass to calculate the number of different triangle primitives that are visible for the pixel. The number of different triangle primitives may then be used to simplify the shading operations while also producing an anti-aliased image when deferred shading is used.

Figure 2A:
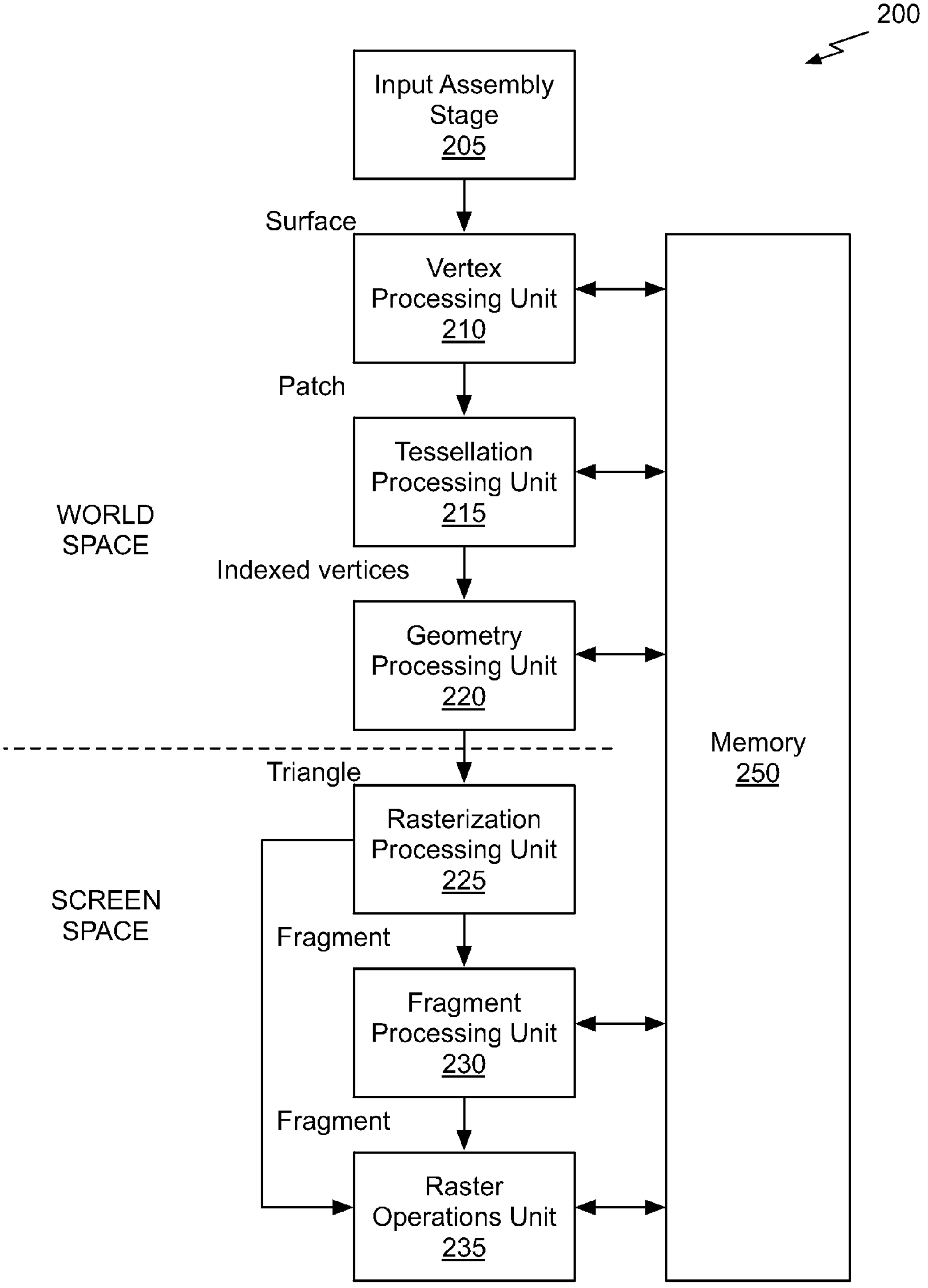
FIG. 2A illustrates a conceptual diagram of processing units configured to generate unique identifiers, in accordance with one embodiment.

FIG. 2A illustrates a conceptual diagram 200 of processing units configured to generate unique identifiers, in accordance with one embodiment. The processing units may be configured in a processing pipeline to process geometry for a scene, generating geometric primitives of a particular type and corresponding primitive identifiers that are unique within a specified scope. The specified scope of the primitive identifiers to be generated may determine which of the processing units within the pipeline generates the primitive identifiers.

As the geometry for a scene is processed by each of the processing units within the pipeline, the geometry is decomposed into simpler geometric primitives, forming a hierarchy of primitives. A high-order geometric primitive, such as a surface is decomposed into successively simpler geometric primitives.

For example, a vertex processing unit 210 may receive a surface definition from an input assembly stage 205 and execute a vertex shader program to generate one or more patches, and associated vertex parameters. Then each patch may be tessellated by the tessellation processing unit 215 to generate indexed vertices that represent the patches. The indexed vertices are grouped by the geometry processing unit 220 to construct primitives such as line segments, triangles, and points that may then be subdivided to generate additional line segments, triangles, and points. Between the geometry processing unit 220 and a rasterization processing unit 225 the primitives are transformed from world space to screen space. When the primitives are represented in screen space, a scope may be specified for generating primitive identifiers, where the scope relates to a region in screen space, as described further herein.

The rasterization processing unit 225 scan converts the primitives by intersecting the triangles with pixels to generate low-order primitive fragments and pixel coverage information. A fragment processing unit 230 is configured to execute fragment shader programs to generate shaded pixels. The shaded pixels are received by a raster operations unit 235 that performs raster operations such as stencil, z test, blending, and the like, and outputs pixel data for storage in a memory 250. The rasterization processing unit 225 may be configured to compute per-sample z values and perform z testing so that primitives that are not visible are not shaded.

When deferred shading is performed, fragments including z data that are output by the rasterization processing unit 225 may bypass the fragment processing unit 230 so that z testing can be performed by the raster operations unit 235 without shading the fragments. The fragments that survive z testing (i.e., hidden surface removal) are stored in the memory 250. Per-sample z values may be computed by the rasterization processing unit 225. During a second pass the surviving fragments are shaded, as described in conjunction with FIGS. 4A, 4B, 4C, and 4D. One or more of the processing units shown in FIG. 2A may be configured to generate primitive identifiers for one or more primitive types and for one or more specified scopes.

The input assembly stage 205 may be configured to generate unique primitive identifiers for each primitive within a single drawcall or within each instance of an instanced drawcall. At the input assembly stage 205, the geometric primitives are high-order primitives such as surfaces. Consequently, a unique identifier that is generated at the input assembly stage 205, according to a drawcall scope, will be shared by all geometric primitives that are generated from the high-order primitive during subsequent processing. For example, when a patch is tessellated by the tessellation processing unit 215, all of the indexed vertices that are produced are assigned the same identifier, the identifier that was generated by the input assembly stage 205 for the surface. The primitive identifiers that are generated by the input assembly stage 205 are not necessarily unique within the entire screen space output surface (e.g., render target, display surface, or frame buffer), any region of the output surface, or even within a single pixel. The input assembly stage 205 also generates primitive identifiers for all input primitives, regardless of the particular primitive type so that a particular primitive identifier is associated with only one primitive of only one type. In contrast, a geometry processing unit 220 may generate the same primitive identifier for a triangle primitive and a line primitive because the two primitives are different types.

To guarantee that the primitive identifier is unique between different drawcalls, a global primitive counter may be used, and, after each drawcall, the counter is adjusted by the number of primitives output by the drawcall. The adjustment may be performed by a processor, such as a central processing unit (CPU) that issues the drawcalls to the input assembly stage 205 within a graphics processing unit (GPU). A buffer within the GPU may contain a copy of the primitive counter that is updated to reflect each adjustment. Similarly, a counter may also be adjusted in the CPU and the GPU for the number of primitives in each instance for an instanced drawcall.

The input assembly stage 205 may be configured to generate primitive identifiers for surface type primitives, but the primitive identifiers are not necessarily unique within a scope associated with the screen space output surface. Because, the processing performed by the input assembly stage 205, the vertex processing unit 210, the tessellation processing unit 215, and the geometry processing unit 220 occurs in world space, it may not be possible for those processing units to generate primitive identifiers that are unique within a scope associated with the output surface that is in screen space. However, the different processing units that operate in world space are able to generate primitive identifiers for different primitive types in terms of the primitive hierarchy. The scope may be specified relative to the different primitive types. For example, during execution of a vertex shading program, the vertex processing unit 210 may generate primitive identifiers that are unique within a specified scope such as a patch that is a lower-level primitive compared with a surface that is processed by the input assembly stage 205. Also, the primitive identifiers generated by the vertex processing unit 210 may be generated for vertex type primitives that define a patch, whereas the input assembly stage 205 can only generate primitive identifiers for high-level surface type primitives.

During tessellation, the tessellation processing unit 215 may generate primitive identifiers that are unique within a specified scope such as a triangle or line that is a lower-level primitive compared with a surface or patch. Also, the primitive identifiers generated by the tessellation processing unit 215 may be generated for indexed vertices that define triangle and line type primitives. During execution of a geometry shading program, processing of one constructed primitive may generate multiple primitives and a unique identifier may be generated for each one of the multiple primitives. The geometry processing unit 220 may generate primitive identifiers that are unique within a specified scope such as a triangle or line that is a lower-level primitive compared with a surface or patch. Also, the primitive identifiers generated by the geometry processing unit 220 may be separately generated for different primitive types, such as triangle type primitives and line type primitives.

The rasterizaton processing unit 225 may generate primitive identifiers that are unique within a screen space output surface region for each triangle or line primitive type. Any of the processing units that may generate primitive identifiers may include a counter for each combination of primitive type and specified scope. The different primitive types that a processing unit may generate primitive identifiers for is determined by the type of primitives processed by the particular processing unit. For example, the rastization processing unit 225 may generate identifiers for triangles, line segments, and points. The specified scope used by the rasterization processing unit 225 to generate the identifiers may be any region of the output surface. The rasterization processing unit 225 cannot generate identifiers for patch type primitives and the specified scope cannot be a drawcall, patch, or surface.

A primitive identifier that is generated by the fragment processing unit 230 may be unique within a pixel when the specified scope is a pixel. An identifier that is unique within a pixel may be represented by fewer bits than an identifier that is unique within an entire output surface that typically includes thousands of pixels. The numerical range of the identifiers should be sufficient to encode all possible unique primitives of a type within the specified scope. When the specified scope is a pixel that includes 4 samples, the range of possible unique primitives of the fragment type is 4, and a range of 4 can be represented by 2 bits. When 32-bit values are used for primitive identifiers, up to 4,294,967,296 unique identifiers may be generated. The amount of memory needed to store the primitive identifiers may be reduced by specifying a scope that limits the number of unique identifiers, as described in conjunction with FIGS. 3A and 3B.

In one embodiment, atomic operations are used to generate unique fragment identifiers. A pixel shader that is executed for every fragment can execute an atomic operation to generate and either return or store the unique fragment identifier. The fragment identifier is returned when a fragment that will not be overwritten in the output surface already is associated with the generated fragment identifier, so a different fragment identifier should be generated by the pixel shader. The raster operations unit 235 may also be configured to generate unique identifiers for each fragment primitive type when depth and/or color data of a given fragment is written into the output surface.

Figure 2B:
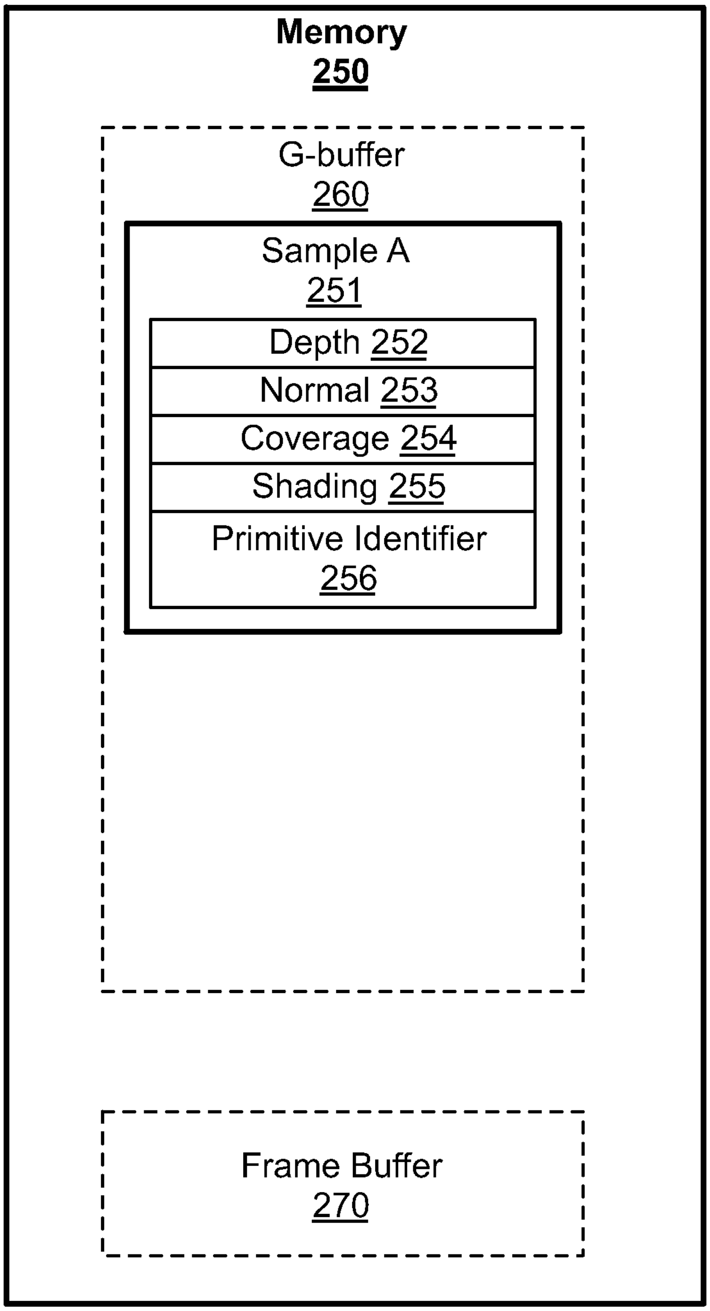
FIG. 2B illustrates a conceptual diagram of the memory of FIG. 2A including allocations corresponding to a multi-sample geometry buffer (G-buffer) and a frame buffer stored in memory, in accordance with one embodiment.

FIG. 2B illustrates a conceptual diagram of the memory 250 of FIG. 2A including allocations corresponding to a multi-sample G-buffer 260 and a frame buffer 230 (i.e., output surface), in accordance with one embodiment. As previously explained, a G-buffer 260 is a screen space output surface that may be generated when techniques such as deferred shading are used. Deferred shading decouples the shading of pixels from the computing of complex geometry and lighting conditions in a scene. The G-buffer 260 is generated during geometry rendering and rasterizing and stores attributes of all visible geometry for each pixel of an output surface. The attributes may include parameters related to depth, a normal vector, a tangent vector, a material property, a position within world space, lighting, color, transparency, texture map coordinates, and other coordinates (e.g., bump map, lighting map, etc.). When multi-sampling is used, the G-buffer 260 stores attributes for each sample within a pixel. As shown in FIG. 2A, for each sample A 251 of each pixel, the G-buffer 260 stores a surface normal vector 253, a depth value 252, coverage information 254, shading data 255, and a primitive identifier 256. In one embodiment, the coverage information 254 may be a single bit that indicates whether the sample is covered by at least one primitive. The coverage information 254 only indicates that the sample is covered and, unlike the primitive identifier 256, does not provide any information that can be used to determine which primitive covered the sample.

The G-buffer 260 is processed to generate shaded pixels for an image that is suitable for display. However, a conventional G-buffer that does not also store a primitive identifier for each sample lacks sufficient geometric pixel coverage data to produce an anti-aliased image. In one embodiment, one or more of the attributes, surface normal vector 253, depth value 252, coverage 254, and shading data 255 are not stored in the G-buffer 260 and the primitive identifier 256 is used to obtain the attribute(s) from a portion of memory that stores the attributes for each primitive.

The multi-sample G-buffer 260 may be allocated as a single contiguous portion of memory or a separate sample G-buffer 260 may be allocated for each of the different sample locations within a pixel. Similarly, one or more of the attributes stored in the G-buffer 260 may be allocated separately. A frame buffer 270 is allocated to store a single, shaded color for each pixel. Unlike the G-buffer 260, the size of the frame buffer 270 does not increase as the number of samples per pixel increases. In contrast, a conventional anti-aliasing technique may require allocation of a single color buffer to store multiple samples for each pixel or separate color buffers for each sample.

Figure 3A:
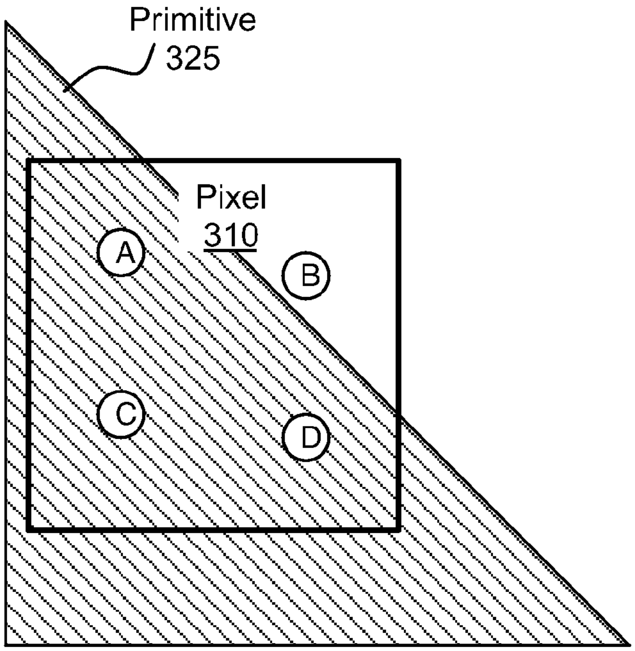
FIG. 3A illustrates a conceptual diagram of a primitive covering sample locations in a pixel, in accordance with one embodiment.

FIG. 3A illustrates a conceptual diagram of a primitive 325 covering sample locations in a pixel 310, in accordance with one embodiment. When multi-sampling is used with 4 samples, four separate z values corresponding to locations A, B, C, and D are stored in the multi-sample G-buffer 260 for each pixel. Each z value for the same primitive may be different. Typically, other attributes that are computed for the primitive are computed once for the pixel and the computed value is used for all of the samples within the pixel that are covered by the primitive. For example, the normal vector 253 and shading attributes 255 for one or more samples of the pixel 310 may be the same. Therefore, the several attributes stored in the G-buffer for different samples of the same pixel may be equal. As shown in FIG. 2A, the sample locations may be jittered (i.e., distributed) within each pixel to improve the image quality. In one embodiment, a sample location may be positioned at the center of each pixel.

In contrast with the multi-sample G-buffer 260, the frame buffer 270 only stores a single value for each pixel. Four separate color values (i.e., shaded samples) may be computed that each correspond to locations A, B, C, and D and the shaded samples are modulated before being accumulated into the single value for a pixel. For example, when four samples are used, each shaded sample is scaled by $1/4^{th}$ to modulate the shaded sample. In general, each shaded sample is divided by the number of samples per pixel to modulate the shaded sample. During deferred shading, the shaded samples for each pixel are computed and are accumulated (i.e., summed or added) directly into the frame buffer 270 during a second processing pass to generate the anti-aliased color value for the pixel.

As shown in FIG. 3A, the primitive 325 covers samples A, C, and D and does not cover sample B. The attributes, including the primitive identifier associated with the primitive 325 are stored in the G-buffer 260 for samples A, C, and D during the first processing pass.

During the second processing pass, when the G-buffer 260 is processed to generate shaded samples, the primitive identifiers for samples A, C, and D indicate that the samples are covered by a single primitive. Therefore, the shading attributes 255 stored for one of the covered samples A, C, or D may be processed to compute the shaded sample for each of the covered samples. Typically, the shading attributes 255 for a primitive are computed at a single sample location (e.g., the center) for a pixel. Therefore, the shading attributes 255 that are stored in the G-buffer 260 for the pixel 310 are the same for sample A, C, and D. Instead of separately computing a shaded sample for each sample, a single shaded sample can be computed and used for samples A, C, and D, reducing the number of shading computations from 3 to 1. However, without the primitive identifiers, it is not possible to determine that samples A, C, and D are covered by the same primitive and the shading computations need to be performed for each sample to ensure a correct result.

In one embodiment an ordering requirement may be applied during the generation of the unique primitive identifiers. For example, if the specified scope is a particular patch, an ordering requirement can ensure that every time a patch is rendered, triangles generated by processing the patch are assigned the same primitive identifiers. The ordering requirement may be used when the G-buffer 260 (or a memory accessed by the primitive identifiers) does not store the data (e.g., at least shading attributes 255) needed to generate shaded samples.

Figure 3B:
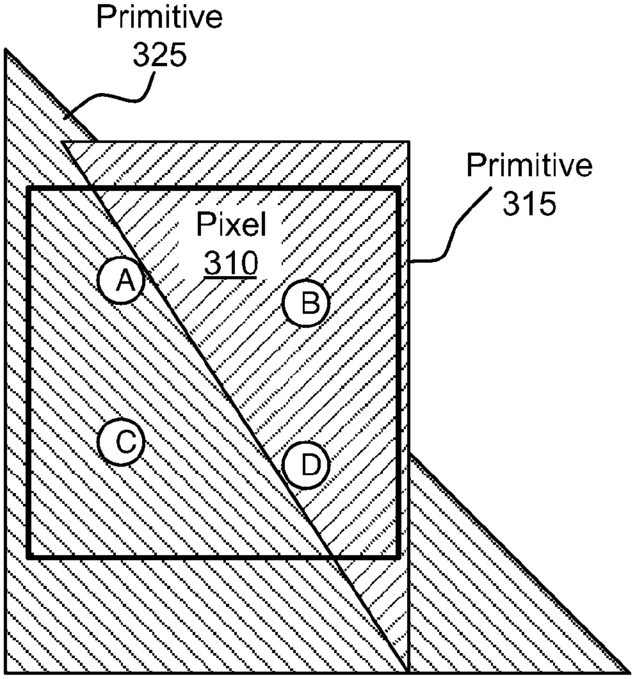
FIG. 3B illustrates a conceptual diagram of the primitive and an additional primitive covering sample locations in the pixel, in accordance with one embodiment.

FIG. 3B illustrates a conceptual diagram of the primitive 325 and an additional primitive 315 covering sample locations in the pixel 310, in accordance with one embodiment. The primitive 315 is in front of the primitive 325. When the primitive 315 is processed, the z value and other attributes computed for the primitive 315, as well as the primitive identifier corresponding to the primitive 315, are written to the G-buffer 260 for the samples B and D within the pixel 310. The coverage 254 indicates that each sample in the pixel 310 is covered and the primitive identifiers 256 indicate which, if any, samples are covered by the same primitive.

Figure 4A:
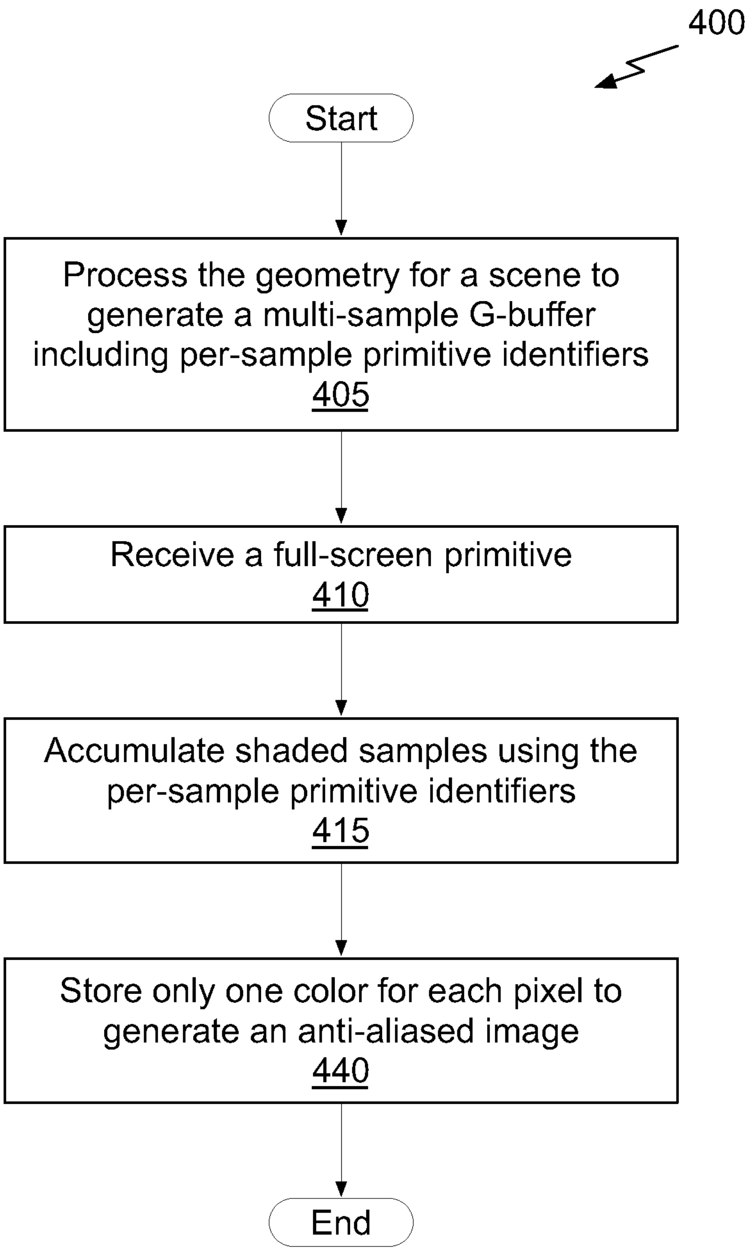
FIG. 4A illustrates a flowchart of a method for generating an anti-aliased image using the unique identifiers, in accordance with one embodiment.

FIG. 4A illustrates a flowchart of a method 400 for generating an image using the unique identifiers, in accordance with one embodiment. When a multi-sample G-buffer 260 is used, the image may be anti-aliased. The method shown in FIG. 4A may be performed by a GPU that includes one or more of the processing units and memory shown in FIG. 2A. At step 405, the geometry for a scene is processed in a first processing pass to generate a multi-sample G-buffer 260 that includes per-sample primitive identifiers. After the first processing pass, the G-buffer 260 stores the information that is needed to generate shaded samples for each pixel that is covered by a primitive. The identifiers are unique within a specified scope and for each particular type of primitive.

At step 410, a full-screen primitive is received for processing in a second processing pass. In the context of this description, a full-screen primitive covers all of the pixels in the display surface. At step 415, during processing of the full-screen primitive, shaded samples are computed for each pixel that is covered by the full-screen primitive. The shaded samples are computed using the per-sample primitive identifiers and the shaded samples are accumulated to generate shaded pixels. The details of step 415 are described in conjunction with FIG. 4B. At step 440, one shaded color value is stored in a frame buffer for each pixel to generate an anti-aliased image.

Figure 4B:
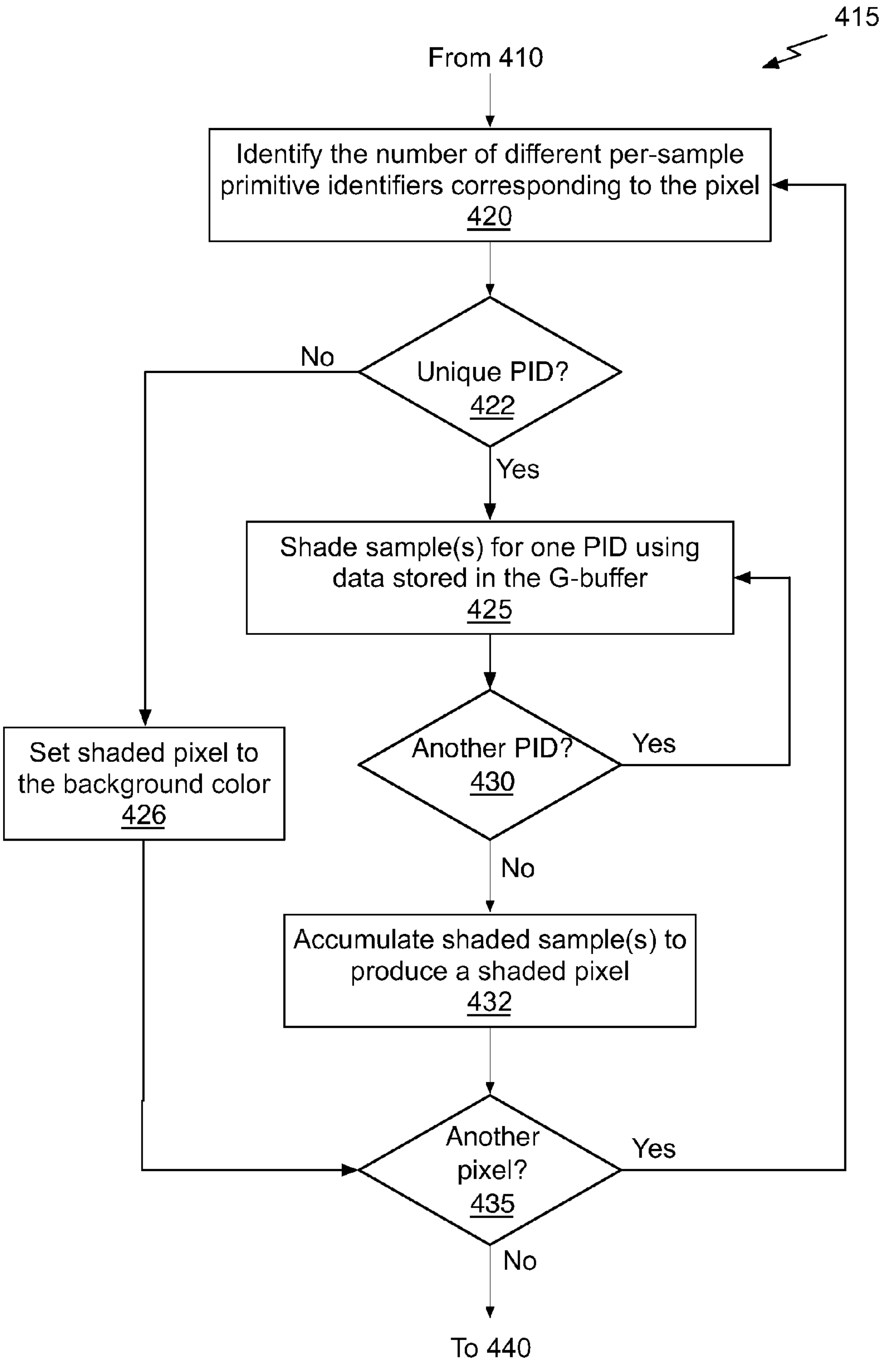
FIG. 4B illustrates a flowchart of an operation shown in FIG. 4A, in accordance with one embodiment.

FIG. 4B illustrates a flowchart of step 415 shown in FIG. 4A, in accordance with one embodiment. The steps shown in FIG. 4B may be performed by the fragment processing unit 230 or another processing unit that is configured to process fragments. At step 420, the number of different per-sample primitive identifiers corresponding to the pixel is identified by the fragment processing unit 230. For example, the number of different per-sample primitive identifiers for the pixel 310 shown in FIG. 3A is one and the number of different per-sample primitive identifiers for the pixel 310 shown in FIG. 3B is two. At step 422, the fragment processing unit 230 determines if any unique primitive identifier (PID) was identified. If no unique PID is identified, then the pixel is not covered by any primitive, and, at step 426, the shaded pixel color is set to a background color before the fragment processing unit proceeds to step 435. If at least one sample is covered by the primitive, at step 425, the fragment processing unit 230 shades the sample(s) that share one PID using data stored in the G-buffer.

At step 430, the fragment processing unit 230 determines if another unique HD was identified at step 420, and, if so, step 425 is repeated. However, if shaded samples have been generated for all of the unique PIDs for the pixel, then at step 432, the fragment processing unit 230 accumulates the shaded samples to generate a shaded pixel color. At step 435, the fragment processing unit 230 determines if another pixel is covered by the full-screen primitive, and, if so, then the fragment processing unit 230 returns to step 420. Otherwise, the fragment processing unit 230 proceeds to step 440 of FIG. 4A.

As previously explained, when the scope is specified as a pixel, the number of bits needed to represent a primitive identifier for each fragment within the pixel is reduced. Every pixel can contain a maximum of N unique fragments, where N is the number of samples in a pixel according to a multi-sample mode. Therefore, to assign every fragment in a pixel a unique identifier, only Lg(N) bits are required. When the primitive identifiers are generated for each fragment using a scope specified as a pixel, an atomic operation may be used to compare a generated primitive identifier with the primitive identifiers stored for the pixel that will not be overwritten by the generated primitive identifier to ensure that each identifier is unique.

Some deferred shading techniques do not generate a G-buffer 260 that can be processed to generate the shaded pixel colors. The amount of memory needed to store the G-buffer 260 may be significantly reduced by storing less data and instead regenerating the data needed to produce the shaded pixel colors during the second processing pass. For example, a semi-deferred shading technique processes the geometry for a scene two times, during the first and the second processing pass. During the first processing pass the z values are computed and z-testing is performed to store the closest z values for each sample in the G-buffer. Primitive identifiers are also computed and stored in the G-buffer. During the first processing pass the normal vector may also be computed and stored in the G-buffer or in another memory that can be accessed using the primitive identifiers. Between the first and the second processing pass, operations may be performed to implement lighting, shadowing, and other effects. For example, an intervening processing pass may be performed to compute a scalar intensity of light reflecting from each pixel over all interior light sources. A camera matrix and the depth values can be used to restore the world-space 3D position of a surface point visible in the pixel and a world-space normal vector in the restored surface point can be fetched from the G-buffer 260.

During the second processing pass, the geometry for the scene is resubmitted for processing with the z-test mode set to equal or less-than-or-equal so that only the visible fragments pass the z test. The fragment processing unit 230 reads the lighting data generated during the intervening pass and stored in the G-buffer 260, combines the lighting data with material properties for the surface, and adds a lighting contribution from sunlight. Because the material properties of the surface are available during the second processing pass, a reflected sunlight color contribution may be computed for each sample or pixel. The reflected sunlight color contribution may be computed using the per-sample normal vector stored in the G-buffer 260 during the first processing pass. In contrast with the deferred shading technique described in conjunction with FIGS. 2B, 4A, and 4B, during the first processing pass the G-buffer 260 need not store all of the material attributes that are needed to compute the shaded samples. Accordingly, all of the material attributes are not necessarily generated during the first processing pass.

However, when semi-deferred shading is implemented, an ordering requirement should be applied during the generation of the primitive identifiers so that the primitive identifier for each primitive processed during the first processing pass matches the primitive identifier generated for the primitive during the second processing pass. Therefore, during the second processing pass, the regenerated primitive identifiers may be compared with the stored primitive identifiers to compute per-sample attributes such as the shaded samples. When data or attributes for a primitive, such as material properties, are stored outside of the G-buffer 260, either the stored or the regenerated primitive identifier may be used to fetch primitive data or attributes.

Figure 4C:
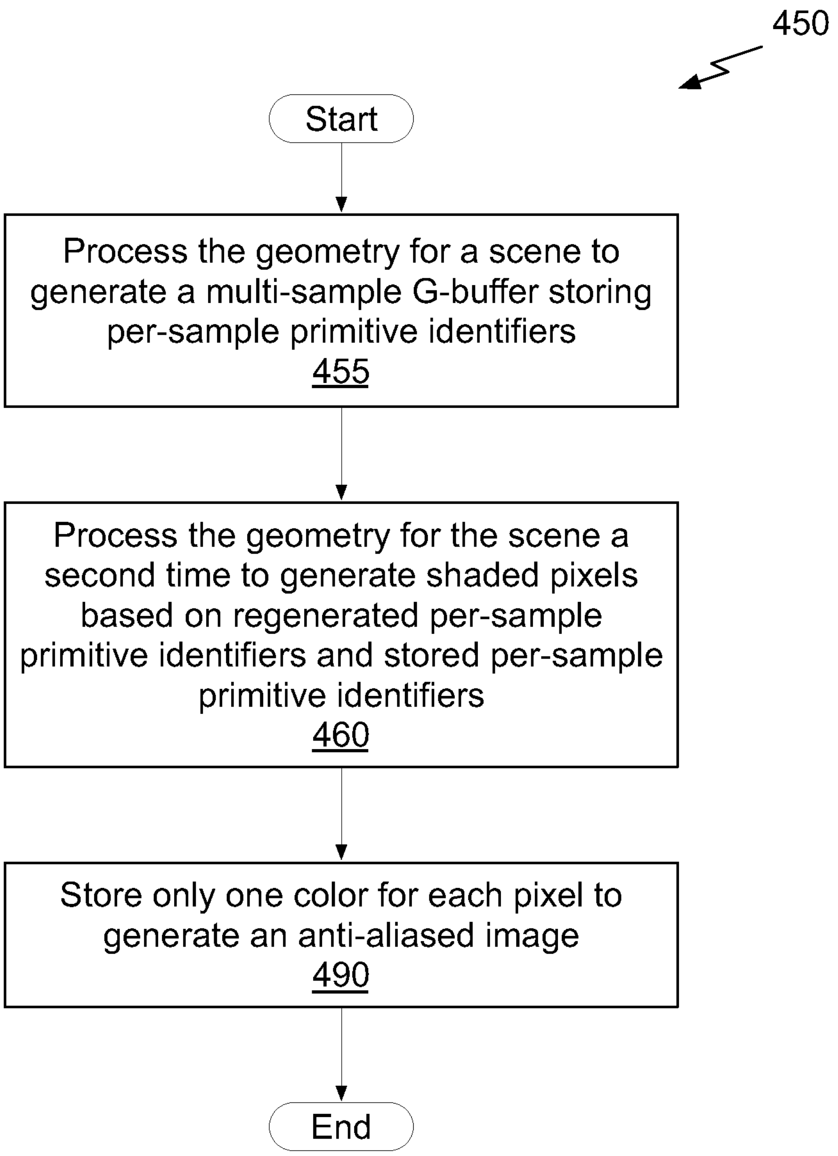
FIG. 4C illustrates a flowchart of another method for generating an anti-aliased image using the unique identifiers, in accordance with one embodiment.

FIG. 4C illustrates a flowchart of another method 450 for generating an image using the generated primitive identifiers, in accordance with one embodiment. When a multi-sample G-buffer 260 is used, the image may be anti-aliased. The method shown in FIG. 4C may be performed by a GPU that includes one or more of the processing units and memory shown in FIG. 2A. At step 455, the geometry for a scene is processed in a first processing pass to generate a multi-sample G-buffer 260 that includes per-sample primitive identifiers. After the first processing pass, the G-buffer 260 does not necessarily store the information that is needed to generate shaded samples for each pixel that is covered by a primitive. The per-sample primitive identifiers are unique within a specified scope and for each particular type of primitive.

At step 460, the geometry for a scene is processed in a second processing pass, during which, shaded samples are computed for each pixel that is covered by a primitive. The shaded samples are computed based on the per-sample primitive identifiers stored in the G-buffer 260 and per-sample primitive identifiers that are regenerated during the second processing pass. The shaded samples are accumulated to generate shaded pixels. The details of step 460 are described in conjunction with FIG. 4D. At step 490, one shaded color value is stored in a frame buffer for each pixel to generate an anti-aliased image.

Figure 4D:
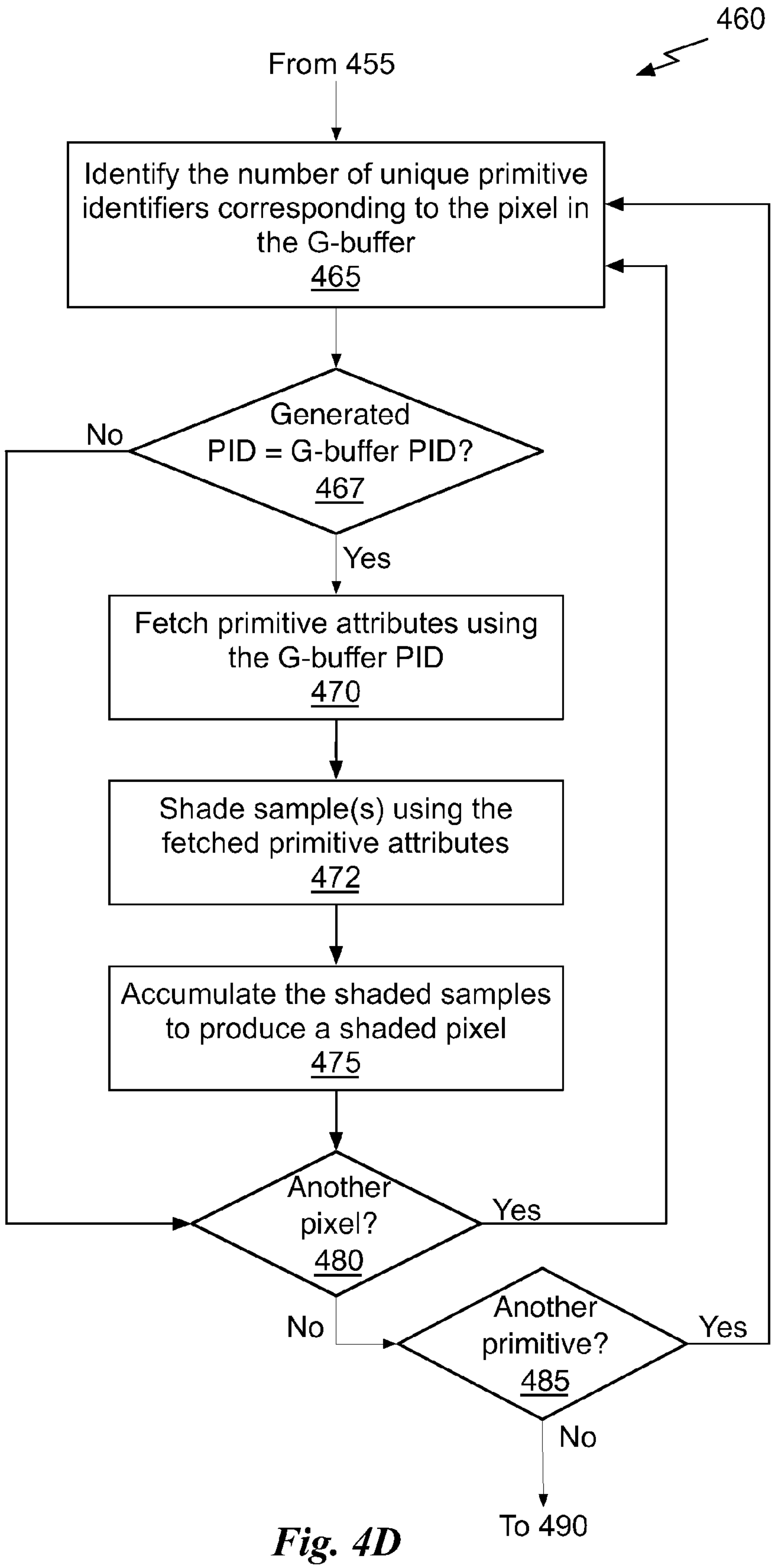
FIG. 4D illustrates a flowchart of an operation shown in FIG. 4C, in accordance with one embodiment.

FIG. 4D illustrates a flowchart of the step 460 shown in FIG. 4C, in accordance with one embodiment. The steps shown in FIG. 4D may be performed by the fragment processing unit 230 or another processing unit that is configured to process fragments. Only fragments that survive z testing during the second processing pass will reach the fragment processing unit 230. At step 465, the number of different per-sample primitive identifiers corresponding to the pixel is identified by the fragment processing unit 230. At step 467, the fragment processing unit 230 determines if a generated primitive identifier (PH)) equals any of the unique primitive identifiers for the pixel. If none of the stored PIDs matches the generated PID, then the pixel is not covered by the primitive. While it is unlikely that a primitive will pass the z test during the second processing pass and not have a regenerated primitive identifier that matches the stored primitive identifier, it is possible for two primitives to have equal z values for one or more samples. In that situation, both of the two primitives will pass the z test and the second primitive that passes the z test will be considered to be the frontmost primitive. It is also possible for the z values computed for the same primitive to vary slightly between the first processing pass and the second processing pass, so that a primitive may incorrectly pass the z test. In either case, the regenerated primitive identifier may be used to ensure the correct primitive is identified.

When none of the stored PIDs matches the regenerated PID, the fragment processing unit 230 proceeds to step 480. Otherwise, at step 470, the fragment processing unit 230 fetches the primitive attributes needed to shade the pixel using either the stored PID or the regenerated PID. One or more of the primitive attributes may be fetched from the G-buffer 260 or from another memory. At step 472, the fragment processing unit 230 shades the sample(s) that share the stored PID using the fetched primitive attributes.

At step 475, the fragment processing unit 230 accumulates the shaded samples to generate a shaded pixel color. Additional shaded samples may be accumulated to produce a final shaded pixel color value when subsequent primitives are processed that cover the pixel. At step 480, the rasterization processing unit 225 determines if another pixel is covered by the primitive, and, if so, then the rasterization processing unit 225 provides another fragment to the fragment processing unit 230 and the fragment processing unit 230 returns to step 465. Otherwise, the rasterization processing unit 225 determines if another primitive should be processed. When another primitive should be processed, the method 460 proceeds to step 465. Otherwise, if another primitive does not need to be processed, then the rasterization processing unit 225 proceeds to step 490 of FIG. 4C.

Figure 5:
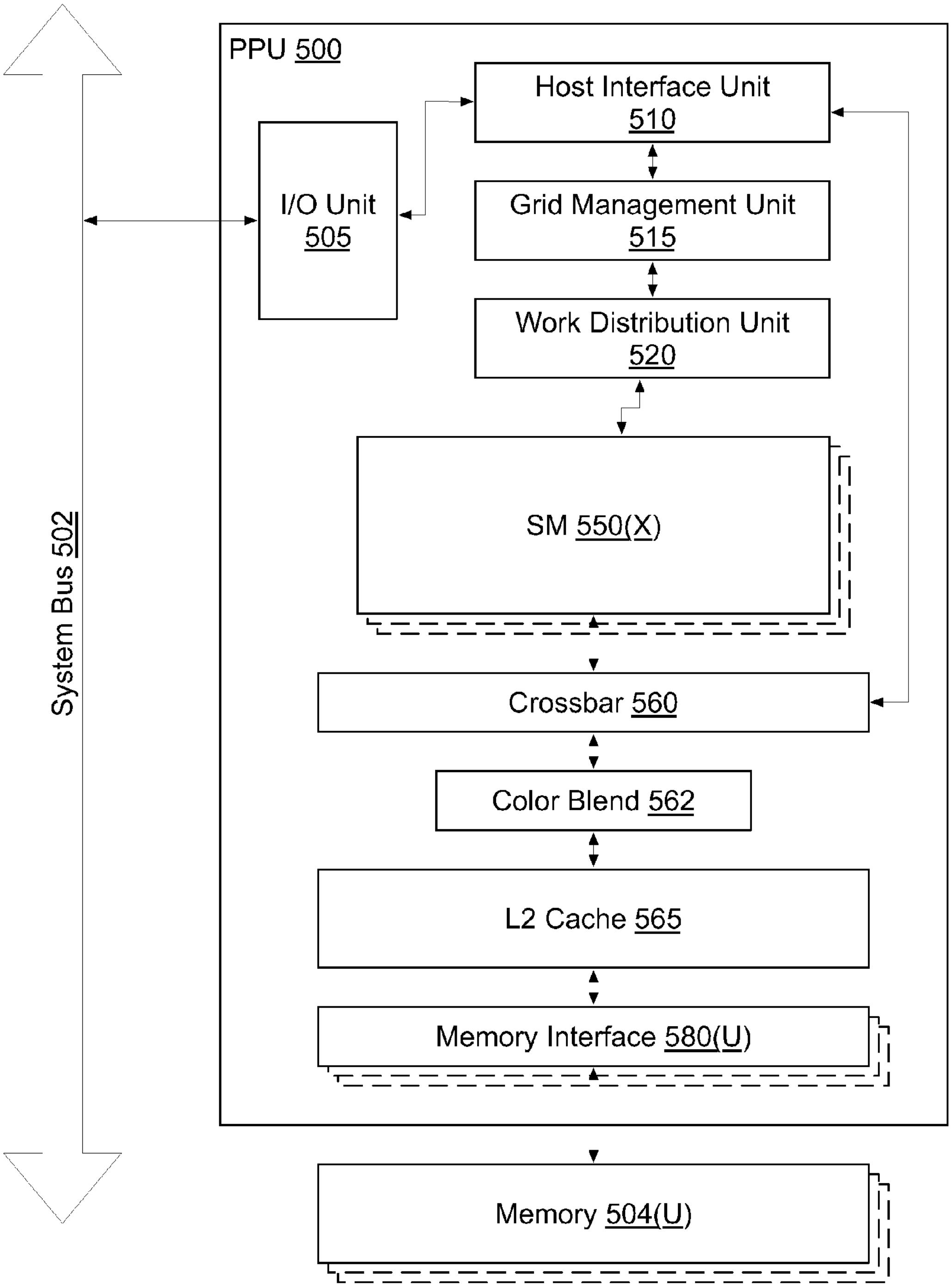
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (110) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550 (X). For example, the PPU 500 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). A color blend unit 562 is configured to perform blend functions, such as the blend function used to accumulate shaded sample color values into a color buffer that may be stored in the memory 540 and cached in the L2 cache 565.

The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc.

For example, the GMU 515 may configure one or more SMs 550 to execute a vertex shader program that processes a number of vertices defined by the model data. In one embodiment, the GMU 515 may configure different SW 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A pixel shader program may be configured to generate anti-aliased images according to the techniques described in conjunction with FIGS. 1-4 when executed by one or more SMs 550. The multi-sample z buffer, multi-sample stencil buffer and accumulated color buffer may be stored in the memory 504. In addition to reducing the amount of memory allocated for storing color data, when the two pass technique is used to generate the anti-aliased image, the bandwidth that is consumed to generate the accumulated color buffer is reduced compared with generating a multi-sample color buffer. Reducing the amount of space needed for storing the color buffer and reducing the memory bandwidth that is consumed may improve processing performance of the PPU 500 when anti-aliased images are generated.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
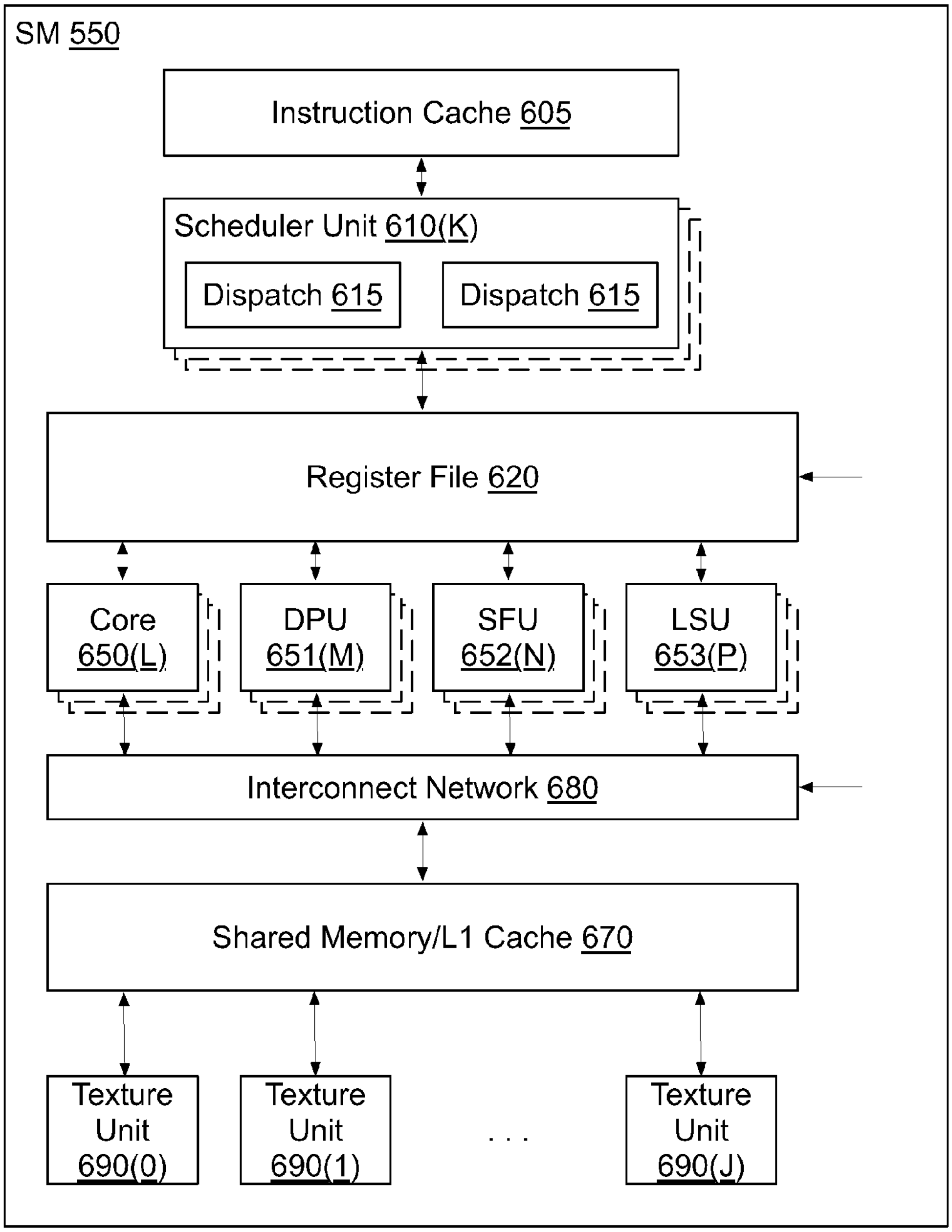
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises/texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
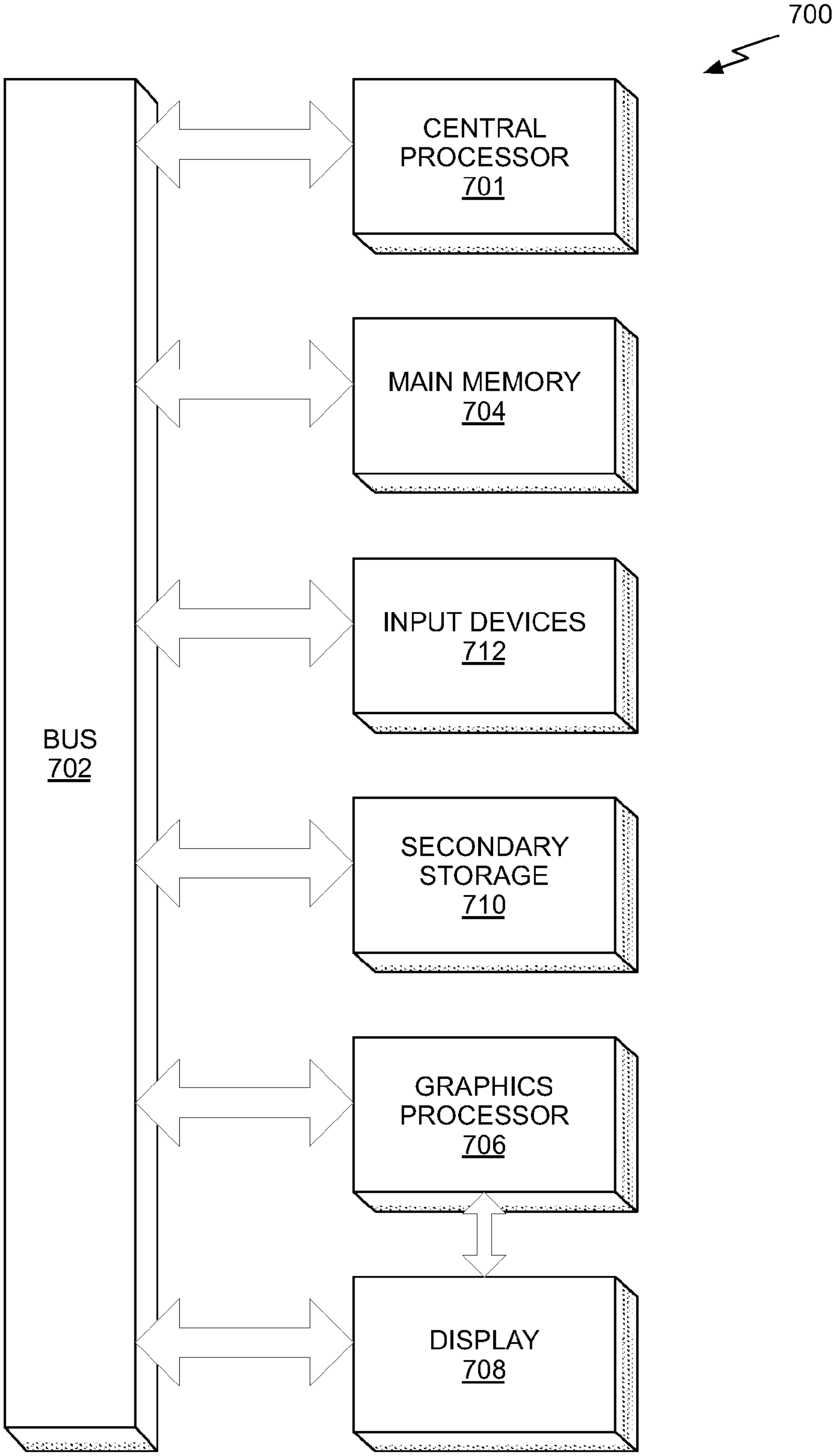
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702, The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of generating identifiers, comprising:
- receiving a specified scope;
- receiving geometry for a three-dimensional (3D) graphics scene; and
- during a first processing pass of the geometry for the 3D graphics scene by a graphics processing unit:
  - generating a primitive identifier for each primitive of a particular type, wherein each of the primitive identifiers within the specified scope does not equal another primitive identifier among all primitives of the particular type that are also within the specified scope; and
  - generating a multi-sample geometry buffer comprising at least two samples per pixel that stores one of the primitive identifiers for each sample covered by at least one of the primitives.

2. The method of claim 1, wherein the specified scope is related to a display surface.

3. The method of claim 1, wherein the specified scope is a frame and the primitive identifiers are generated by the graphics processing unit.

4. The method of claim 1, wherein the specified scope is a pixel and the primitive identifiers are generated during rasterization.

5. The method of claim 1, wherein the particular type is selected from a group consisting of a patch, mesh, vertex, line segment, triangle, and fragment.

6. The method of claim 1, further comprising:
- identifying a number of different primitive identifiers corresponding to a pixel; and
- computing a number of shaded samples for the pixel, wherein the number of different primitive identifiers corresponds to the number of shaded samples.

7. The method of claim 1, further comprising processing the multi-sample geometry buffer, based on the primitive identifiers, to compute shaded pixels for display.

8. The method of claim 1, further comprising, fetching data used to compute a shaded sample value, wherein the data is associated with a first primitive and is fetched from storage outside of the multi-sample geometry buffer based on the stored primitive identifier that corresponds to the first primitive.

9. The method of claim 1, further comprising processing the geometry for the 3D graphics scene by a graphics processing unit during a second processing pass to regenerate the primitive identifiers.

10. The method of claim 9, further comprising, during the second processing pass,
- determining a first regenerated primitive identifier associated with a first sample matches a primitive identifier associated with the first sample that is stored in the multi-sample geometry buffer; and
- computing a shaded sample for the first sample when the first stored primitive identifier matches the first regenerated primitive identifier.

11. A system comprising:
- a memory storing geometry for a three-dimensional (3D) graphics scene and a multi-sample geometry buffer comprising at least two samples per pixel; and
- a graphics processing unit that is coupled to the memory and configured to:
  - receive a specified scope;
  - receive the geometry for the 3D graphics scene; and
  - during a first processing pass of the geometry for the 3D graphics scene:
  - generate a primitive identifier for each primitive of a particular type, wherein each of the primitive identifiers within the specified scope does not equal another primitive identifier among all primitives of the particular type that are also within the specified scope; and
  - store one of the primitive identifiers in the multi-sample geometry buffer for each sample that is covered by at least one of the primitives.

12. The system of claim 11, wherein the graphics processing unit includes one or more processing units that may be configured to generate the primitive identifiers.

13. The system of claim 11, wherein the graphics processing unit generates the primitive identifiers during execution of one of a vertex shader program, a geometry shader program, and a fragment shader program.

14. The system of claim 11, wherein specified scope is a pixel and the primitive identifiers are generated during rasterization.

15. The system of claim 11, wherein the particular type is selected from a group consisting of a patch, mesh, vertex, line segment, triangle, and fragment.

16. The system of claim 11, wherein the graphics processing unit is further configured to:

identify a number of different primitive identifiers corresponding to a pixel; and compute a number of shaded samples for the pixel, wherein the number of different primitive identifiers corresponds to the number of shaded samples.

17. The system of claim 11, wherein the graphics processing unit is further configured to, during a second processing pass of the geometry for the 3D graphics scene:

regenerate the primitive identifiers;

determine a first regenerated primitive identifier associated with a first sample matches a primitive identifier associated with the first sample that is stored in the multi-sample geometry buffer; and compute a shaded sample for the first sample when the first stored primitive identifier matches the first regenerated primitive identifier.

18. A non-transitory computer-readable storage medium storing instructions that, when executed by a processor, cause the processor to generate identifiers comprising:

receiving a specified scope;

receiving geometry for a three-dimensional (3D) graphics scene; and during a first processing pass of the geometry for the 3D graphics scene by a graphics processing unit:

generating a primitive identifier for each primitive of a particular type, wherein each of the primitive identifiers within the specified scope does not equal another primitive identifier among all primitives of the particular type that are also within the specified scope; and generating a multi-sample geometry buffer comprising at least two samples per pixel that stores one of the primitive identifiers for each sample covered by at least one of the primitives.

19. The non-transitory computer-readable storage medium of claim 18, wherein the processor is further configured to, during a second processing pass of the geometry for the 3D graphics scene:

regenerate the primitive identifiers;

determine a first regenerated primitive identifier associated with a first sample matches a primitive identifier associated with the first sample that is stored in the multi-sample geometry buffer; and compute a shaded sample for the first sample when the first stored primitive identifier matches the first regenerated primitive identifier.

* * * * *